Aug. 16, 1932.  G. J. PARK ET AL  1,871,465
AIRPLANE WING
Filed July 14, 1931  2 Sheets-Sheet 2
Fig-3-
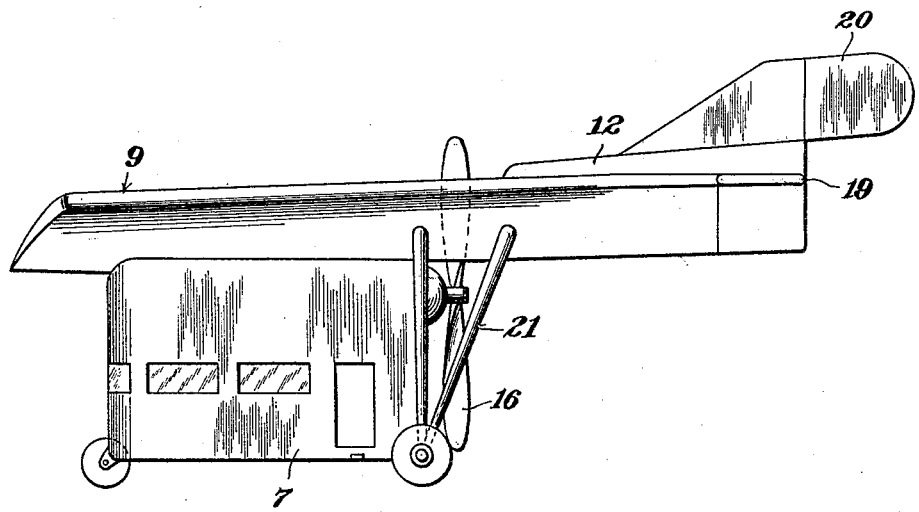
Fig-4-
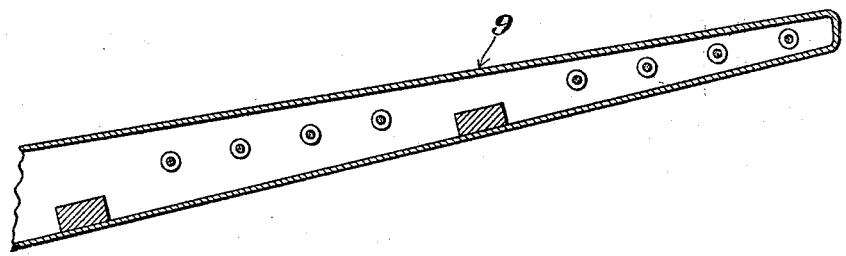
Fig-5-
Gene J. Park
George Antol
INVENTOR
BY Victor J. Evans
ATTORNEY Patented Aug. 16, 1932

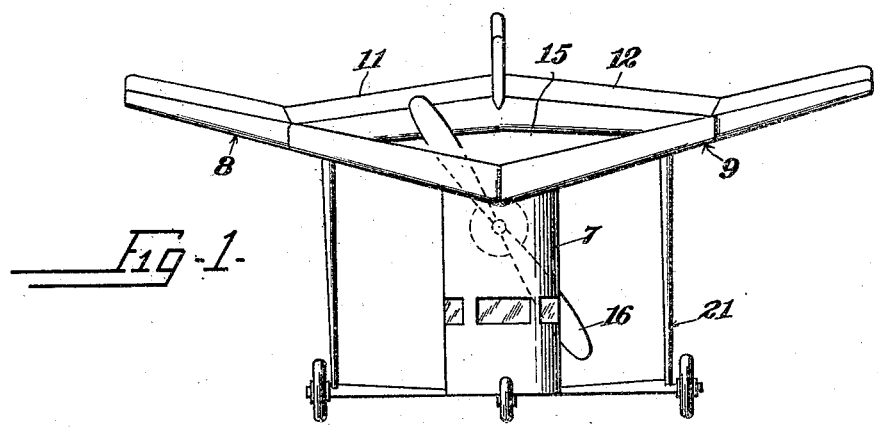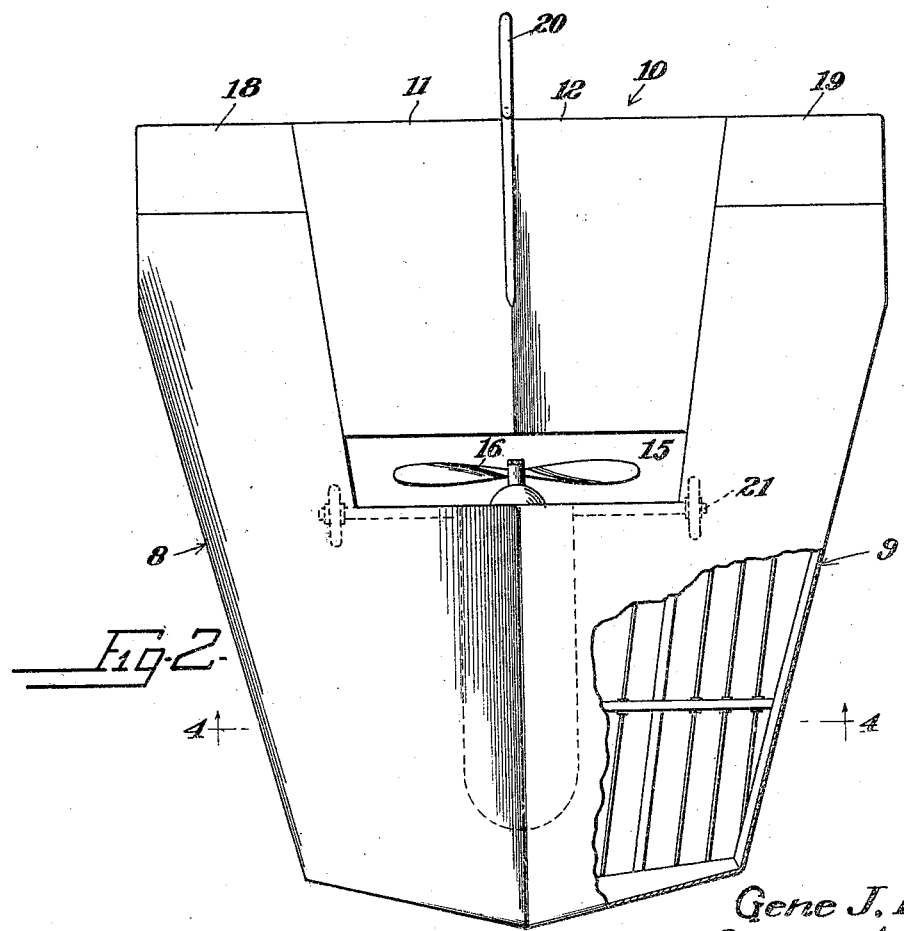

1,871,465

UNITED STATES PATENT OFFICE

GENE J. PARK AND GEORGE ANTOL, OF NEW YORK, N. Y.

AIRPLANE WING

Application filed July 14, 1931. Serial No. 550,788.

This invention relates to airplane wings.

An object of the invention is the provision of airplane wings so constructed as to provide an airplane adapted to land safely.

Another object of the invention is the provision of airplane wings which will allow a greater load to be carried by an airplane.

A further object of the invention is the provision of a streamline airplane wing.

Other objects will be appreciated by those skilled in the art from a reading of the following specification.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention now exceed the scope thereof as expressed in the appended claims.

In the drawings:

Fig. 1 is a front elevation of an airplane having wings constructed in accordance with my invention.

Fig. 2 is a plan view of the airplane shown in Fig. 1.

Fig. 3 is a side elevation of the airplane shown in Fig. 1.

Fig. 4 is a vertical section taken on line 4—4 of Fig. 2; and

Fig. 5 is a diagrammatic view showing a modified configuration of the airplane wings.

Referring to the drawings for a more detailed description thereof, the numeral 7 indicates the body of an airplane. The airplane is provided with a main pair of wings 8 and 9, the front portions of which together form a nose 10.

The wing spread provided by the mentioned wings increases from the front substantially to the rear. Said wings are on opposite sides of the longitudinal median line of the plane and are oppositely inclined and rise from the mentioned longitudinal median line, and are shown in Figs. 1 to 4, inclusive, as having, together, a V-shaped, cross-sectional configuration. As shown in Fig. 5, however, the mentioned wings may together have a concavo-convex configuration in cross-section, with the concave side up. The wings 8 and 9 may be said to be generally U-shaped in plan view, there being a space 10 between the rear portions of the mentioned wings. An auxiliary pair of wings 11 and 12 bridge the greater part of the space between the rear portions of the wings 8 and 9, these auxiliary wings 11 and 12 being oppositely inclined towards each other and respectively oppositely inclined to the wings 8 and 9. The auxiliary wings 11 and 12 are set back from the front portions of the wings 8 and 9 to provide an open space 15 in which a propeller 16 operates, the mentioned propeller being adapted to force a current of air up against the lower faces of the auxiliary wings 11 and 12 to provide a lifting force against the same. The auxiliary wings 11 and 12 in vertical section have, together, an inverted V-shaped configuration, as shown in Figs. 1 to 4, inclusive, but they may together have a concavo-convex configuration with the convex side up, as shown in Fig. 5.

Ailerons 18 and 19 are connected, respectively, to the rear ends of the wings 8 and 9. A rudder 20 is shown as extending from the apex of the auxiliary pair of wings 11 and 12. Any usual or preferred landing gear 21, as shown in the drawings, may be employed. It is to be understood that the wings may be constructed of any suitable material and according to any usual or preferred structure, our invention not being concerned with the manner in which the wing elements are connected together nor with the material employed in the construction.

It will readily be appreciated by those skilled in the art that from the foregoing description the construction described provides airplane wings capable of fulfilling the objects of our invention as stated at the beginning of this specification.

What we claim is:

1. In an airplane, a pair of wings inclined upwardly from a longitudinal median line of the airplane and tapering in their combined width and in a forward direction, and a pair of auxiliary wings inclined downwardly from a longitudinal median line, said auxiliary wings being of much less width than the first said wings and terminating at the top face of the latter.

2. In an airplane, a pair of wings inclined upwardly from a longitudinal median line of the airplane and tapering in their combined width and in a forward direction, and a pair of auxiliary wings inclined downwardly from a longitudinal median line, said auxiliary wings being of much less width than the first said wings and terminating at the top face of the latter, said auxiliary wings being of much less length than the first said wings but having their rear edges disposed in the same vertical plane as the rear edges of the first said wings.

In testimony whereof we hereby affix our signatures.

GENE J. PARK.
GEORGE ANTOL.